(12) United States Patent
McCormack et al.

(10) Patent No.: US 7,870,219 B2
(45) Date of Patent: Jan. 11, 2011

(54) SYSTEM METHOD AND APPARATUS FOR PORTABLE DIGITAL IDENTITY

(75) Inventors: Jonathan I McCormack, Sunnyvale, CA (US); Venkatachary Srinivasan, Sunnyvale, CA (US); Hari Vasudev, Milpitas, CA (US); Raymond Drewry, Woodside, CA (US)

(73) Assignee: TVWorks, LLC, Philadelphia, PA (US)

( * ) Notice: Subject to any disclaimer, the term of this patent is extended or adjusted under 35 U.S.C. 154(b) by 121 days.

(21) Appl. No.: 12/400,541

(22) Filed: Mar. 9, 2009

(65) Prior Publication Data

US 2009/0313355 A1 Dec. 17, 2009

Related U.S. Application Data

(63) Continuation of application No. 09/977,085, filed on Oct. 12, 2001, now abandoned.

(51) Int. Cl.
*G06F 15/167* (2006.01)

(52) U.S. Cl. .................. 709/213; 709/203; 709/205; 709/217; 709/219; 709/225; 709/229; 709/248

(58) Field of Classification Search ............... 709/203, 709/213, 217, 219, 225, 229, 248
See application file for complete search history.

(56) References Cited

U.S. PATENT DOCUMENTS

| | | | |
|---|---|---|---|
| 5,761,662 A | 6/1998 | Dasan | |
| 6,092,178 A | 7/2000 | Jindal et al. | |
| 6,343,319 B1 | 1/2002 | Abensour et al. | |
| 6,349,410 B1 * | 2/2002 | Lortz | 725/110 |
| 6,434,748 B1 * | 8/2002 | Shen et al. | 725/89 |
| 6,442,589 B1 | 8/2002 | Takahashi et al. | |
| 6,539,422 B1 | 3/2003 | Hunt et al. | |
| 6,546,002 B1 | 4/2003 | Kim | |
| 6,553,405 B1 | 4/2003 | Desrochers | |
| 6,610,105 B1 | 8/2003 | Martin, Jr. et al. | |

(Continued)

FOREIGN PATENT DOCUMENTS

EP 0957617 11/1999

(Continued)

*Primary Examiner*—Michael Won
(74) *Attorney, Agent, or Firm*—Banner & Witcoff Ltd.

(57) ABSTRACT

Two-way digital media devices typically store digital identifying data that identify the user to providers of content and interactive data. In the case of a Web browser of a personal computer, the digital identity is stored in the form of a plurality of cookies that are used by respective web sites to personalize the web site experience for each particular user. When a user is at a different computer, the digital identifying data is not available. In addition, other types of interactive devices, such as CATV settop boxes, cell phones, PDAs and the like, may not have enough non-volatile memory (persistent storage) to store the digital identifying data. In order to provide users with a portable digital identity, a digital identity server is provided as a server node on the Internet, which retrieves digital identifying data and downloads such digital identifying data to any device upon request. In such manner, the user's digital identity is portable and available at any computer or other digital device that is being used. The system digital identity server permits devices without sufficient non-volatile memory storage to download a digital identity for temporary storage in volatile memory, thereby providing a digital identity in devices without non-volatile memory.

17 Claims, 10 Drawing Sheets

U.S. PATENT DOCUMENTS

| | | |
|---|---|---|
| 6,621,528 B1 | 9/2003 | Kessler et al. |
| 6,671,715 B1 | 12/2003 | Langseth et al. |
| 6,741,853 B1 | 5/2004 | Jiang et al. |
| 6,785,680 B1 | 8/2004 | Cragun |
| 2001/0013123 A1 | 8/2001 | Freeman et al. |
| 2002/0013827 A1 | 1/2002 | Edstrom et al. |
| 2005/0097618 A1* | 5/2005 | Arling et al. ................. 725/114 |
| 2006/0015580 A1* | 1/2006 | Gabriel et al. ............... 709/219 |
| 2006/0236352 A1* | 10/2006 | Scott ........................... 725/89 |

FOREIGN PATENT DOCUMENTS

| | | |
|---|---|---|
| EP | 1035741 | 9/2000 |
| EP | 1185116 | 3/2002 |
| WO | 9927681 | 6/1999 |
| WO | 0144911 | 6/2001 |

* cited by examiner

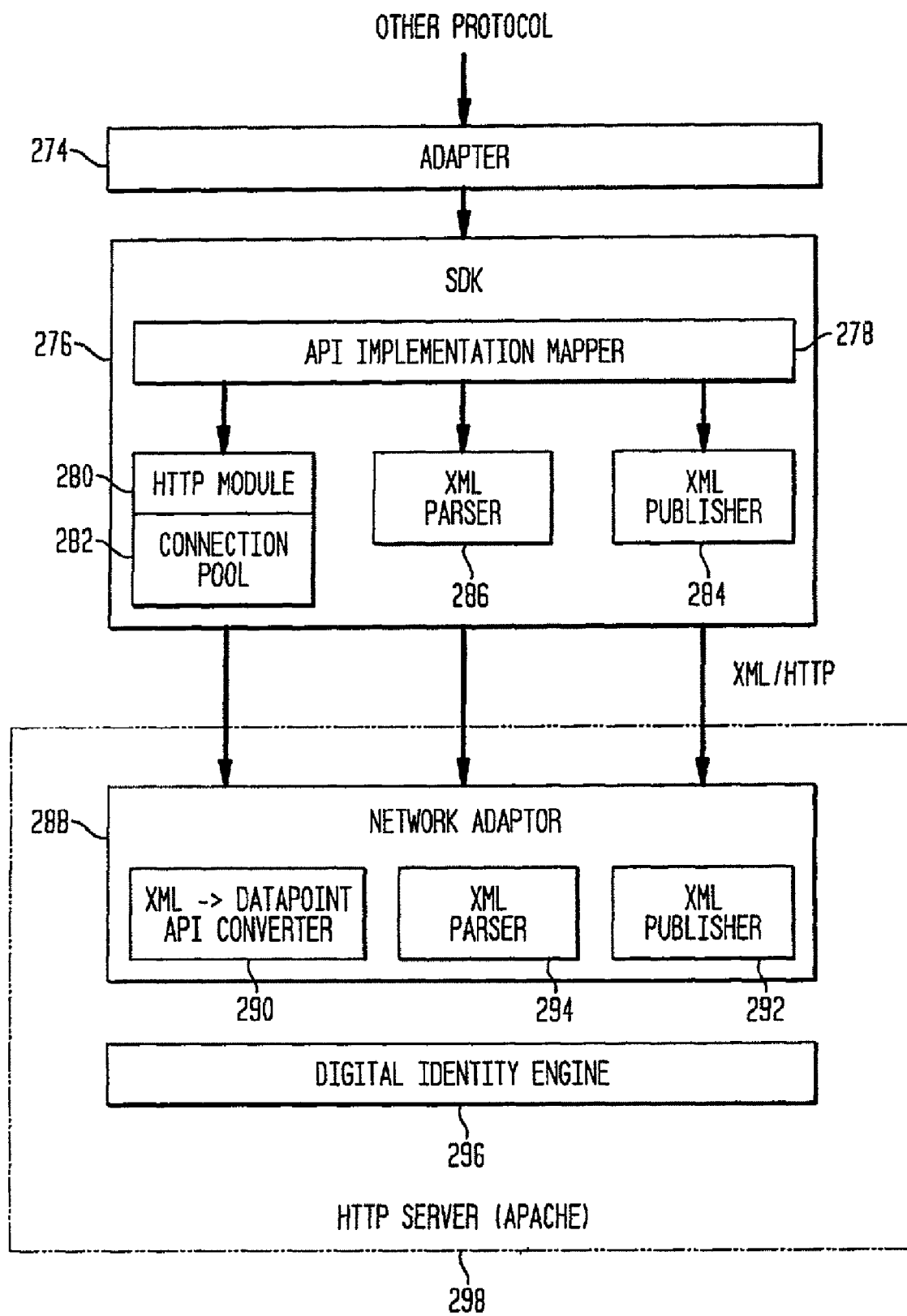

SYSTEM METHOD AND APPARATUS FOR PORTABLE DIGITAL IDENTITY

This application is a continuation of application Ser. No. 09/977,085 filed Oct. 12, 2001, the entire disclosure of which is hereby incorporated by reference.

FIELD OF THE INVENTION

The present invention relates to the field of portable electronic devices and networked electronic communication.

BACKGROUND OF THE INVENTION

The present invention relates generally to the preparation of a whole grain beverage. More particularly, this invention relates to a method for preparing a whole grain beverage via steam injection.

In using any kind of networked communication device, each user has a user profile that defines a personalized electronic environment for that particular communication device.

For example, while surfing the Internet on a personal computer, each Web site supplies individual browsers with unique cookies that store identifying information in the user's Internet browser. When visiting specific web sites, the cookies stored in the browser identify each individual to the web site. Based on the information stored in the browser's cookies, each Web site personalizes its contents according to the individual Internet browser. An individual may select bookmarks or favorite Web sites, which are stored on the individual's personal computer persistent memory (hard drive) and which further customize the electronic environment to suit the user.

As another example of a personalized identity in a networked electronic environment, in a cable television (CATV) system, each subscriber or household subscribes to different programming. Some subscribers have basic cable, while other subscribers have basic cable plus some premium channels. Each member of the household generally has different favorite channels. Additionally, some cable households have broadband Internet access via CATV using a cable modem. In such case, the CATV settop, in communication with a computer at the CATV headend, acts as an Internet browser. However CATV settop boxes tend to have limited computing capabilities, and in particular, CATV settop boxes tend to have limited persistent memory in which to store personalized information such as cookies.

As another example of a personalized identity in a networked electronic environment, a wireless cellular telephone system provides different subscribers with different calling plans specifically selected by the subscriber. Some cellular telephone networks also offer Internet connectivity to their customers. However, as in the case of CATV settop boxes, cellular phones tend to have limited capabilities as Internet browsers, and in particular, tend to have limited persistent memory storage for personalized information such as cookies.

When away from the home environment, the electronic environment is different from that at home. For example, using a settop box in a hotel room means that the subscriber typically does not have access to familiar television programs or customized Internet interface. Borrowing or renting a cellular telephone means that the subscriber may not have access to his regular calling plan, is unable to receive incoming calls using his regular phone number, and does not have the customized Internet environment as he would at home. Generally, when a traveler is surfing the Internet at a remote location, whether it be a computer, a remote CATV settop or a cellular phone away from home, Web sites that normally have customized content suited to the traveler, will not recognize the individual Internet browser while at such remote communications device.

SUMMARY OF THE INVENTION

The present invention is embodied in a digital identity server operating as a node on a distributed computing network such as the Internet.

In accordance with the present invention, a user enters unique identifying information into an electronic communication device. For example, an email address is unique to each person and entering an email address uniquely identifies the individual to the electronic communication device. Furthermore, entering a password in addition to an email address authenticates the user.

In order to personalize the electronic environment, the electronic communication device forwards the user's unique identifying information to the digital identity server via the Internet. The nature and capabilities of the given remote electronic communication device is also forwarded to the digital identity server. The digital identity server responds by transmitting a digital identity corresponding to the user of the given electronic communication device. The received digital identity defines the services for which the user is authorized (e.g. in the case of a CATV subscriber, the received digital identity includes a list of the premium channels that the subscriber is authorized to view). Furthermore, the digital identity server provides a level of functionality suited to the capabilities of the particular electronic communication device. The electronic communication device receives the digital identity of the user and personalizes its operation to suit the user.

The electronic communication device that retrieves the digital identity of the user and personalizes its operation to suit the user may be a CATV settop box, a cellular telephone, a computer, a video game console, an Internet access terminal, a payphone, a vending machine or any present or future electronic communication device. In such manner, the digital identity of the user is made portable, and follows the user wherever the user may go providing the user with the same electronic environment that is accessible from any electronic communication device.

In addition, the portable digital identity system of the present invention facilitates the use of simplified electronic communication devices. In particular, electronic communication devices for accessing the user's portable digital identity may be implemented using very thin client software with or without persistent data storage, making the electronic communication device smaller, lighter and less expensive.

The portable digital identity includes email preferences, an email address book and email client software settings, thereby presenting to the user a seamless and consistent email environment. The portable digital identity includes TV preferences, permitting the user to watch his favorite shows and have his premium channels be available from any hotel room. The portable digital identity includes preferred credit card and shipping information (work and home addresses), as well as preferred carriers and other preferences to facilitate eCommerce applications.

The portable digital identity of the present invention permits the user to access familiar services across different platforms. For example, the present invention permits cross platform authorization (e.g. TV to PC) so that the user may access HBO on a PC. That is, an HBO subscriber may not only access HBO from any remote CATV settop, but may also access HBO on a PC (to the extent that HBO is available via a broadband Internet connection).

The portable digital identity of the present invention includes demographic profiles and marketing data on the user's activities and preferences across devices and in real time. In such manner, for example, an online newspaper viewed at a remote location, contains articles of interest to the subscriber and presents demographically targeted advertising tailored to the interests of the subscriber.

The portable identity of the present invention may be used to control TV appliances. For example, if a user normally records a given television show on a weekly basis, that knowledge can be used to construct a profile of the user that is then mapped to the user's portable digital identity and stored. The profile may then be used by other applications to target application content at the user to suit his or her interests.

BRIEF DESCRIPTION OF THE DRAWINGS

FIG. 2C is a block diagram further detailing the implementation of another network adapter for use with a portable digital identity server in accordance with the present invention.

DETAILED DESCRIPTION

Figure 1A:
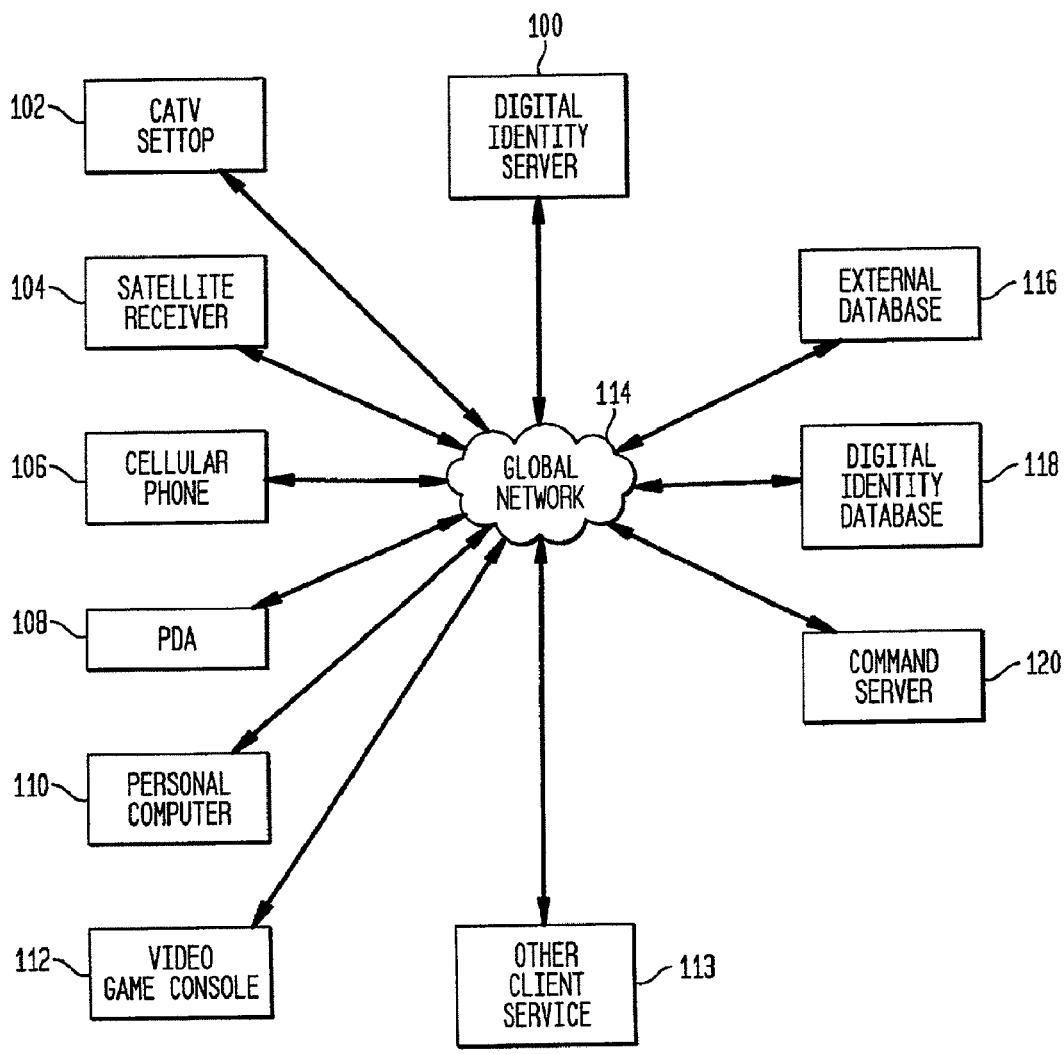
FIG. 1A is a block diagram of a system including a portable digital identity server and a plurality of information appliances forming a global computer network in accordance with the present invention.

As shown in FIG. 1A, the digital identity server 100 communicates over a global computer network 114 (such as would include the Internet as part of the overall global network) with a plurality of user devices. Examples of user devices include a CATV settop 102, a satellite receiver 104, a cellular phone 106, a personal digital assistant (PDA) 108, personal computer 110, video game console 112 or other client device 113. Each user device connects to the Internet though another communication network. For example, a CATV settop box 102 is coupled through a CATV system, while a personal computer 110 is typically coupled through the public switched telephone network. The digital identity server 100 also communicates via the Internet 114 with a digital identity database 118, an external database 116 as well as a command server 120.

In operation, a user identifies himself to a user device 102, 104, 106, 108, 110, 112. The user device 102, 104, 106, 108, 110, 112 requests a digital identity from the digital identity server 100. In response, the digital identity server 100 communicates with the command server 120 to determine the nature and characteristics of the requesting user device 102, 104, 106, 108, 110, 112. The digital identity server 100 then retrieves the digital identity information from either the system database 118 or an external database 116 and downloads it to the requesting user device 102, 104, 106, 108, 110, 112. After the initial download of a digital identity to user device, the digital identity server 100 need not be involved except to download changes to update a user's digital identity.

In such manner, the digital identity server 100 mediates the user's access to applications/services and data from a variety of user devices ranging from a digital set-top box 102 to a portable personal digital assistant 108 to a mobile/cellular phone 106 to a game console 112 to a personal computer 110.

Applications include Video-on-demand (VOD), gaming applications such as multi-player games, email, instant messaging, chat and broadcast based enhanced TV applications. In video-on demand for example, a viewer may pause a movie at a given point. The pause point of the movie becomes part of the viewer's digital identity. When the viewer returns to watch the rest of the movie, the viewer's downloaded digital identity contains the pause point. As a result, the viewer is able to continue watch the remainder of the movie at a later time from any CATV settop 102 communicating with the digital identity server 100.

Additional applications include using an e-wallet (where the e-wallet for a user is tied to his digital identity and stored in the system) and delivering targeted advertising applications (where the profile of the user describing his interests and past behavior is tied to his digital identity and stored in the system).

The range of data contained in the portable digital identity includes the user's properties such as his preferences regarding the use of the device in question, his favorites data including the list of favorite applications and favorite Internet sites. The data includes the user's cookies which facilitate access to internet sites, and the set of applications/services that the user may access including the properties of the user for a specific application/service.

The digital identity server 100 retrieves configuration information from the command server 120 about various types or classes of devices within the system, and applies the configuration information as a filter when returning the digital identity data back to the user device. The set of applications and the generic user properties as well as application specific user properties are tailored to take into account the processing power, network bandwidth and memory footprint capabilities of the communications device currently in use by the user. Thus, when the user is on a powerful communications device, such as a personal computer 110, the list of applications available to such user includes the full set of allowed or subscribed applications. When the user is on a less powerful device such as a set-top box 102 or a personal digital assistant 108, the list of applications available to a user will typically include only a lesser permissible subset of applications.

The digital identity of the user remains the same regardless of the device that the user is using at any point in time. Having a consistent digital identity retrievable at any point by Internet access, allows the user to access his applications/services and data in a seamless and transparent fashion. Thus, even while "roaming" i.e. moving between multiple devices in his home, or to a device at a remote location such as a digital set-top box or game console at a friend's home, or using a cellular phone/pager in his car, the user experiences a consistent electronic environment.

Associated with the notion of a portable digital identity is the notion of a General Services Architecture. The General Services Architecture defines and describes the model that allows the use of applications/services and associated data by the user from their various devices. In particular, the General Services Architecture includes a user account that defines the applications and services to which the user subscribes.

The digital identity server 100 and a General Services Architecture allows the service provider/operator to dynamically define and add new services/applications into their server-side infrastructure. Services are available dynamically to users based on a configurable policy that can be customized to suit the business needs of the specific network operator or service provider.

Furthermore, access to the service can be controlled at a very granular level all the way down to a specific device and a specific user. User A may subscribe to the video on demand (VOD) service, but User B may not be allowed access to the service or even be allowed to subscribe to the service at all. If the user is a subscriber to a specific service he may not be able to access the VOD service unless he is on a device that is actually capable of running that service as is determined by the digital identity server dynamically.

The digital identity of the user as implemented by the digital identity server 100 includes a rich object oriented programming model that provides high reliability and high availability and scales to millions of users. The digital identity server 100 has easy extensibility to new client devices 113 and new server platforms and also provides for easy integration with existing stores 116 of user information being maintained by service providers and operators elsewhere on the Internet.

Figure 1B:
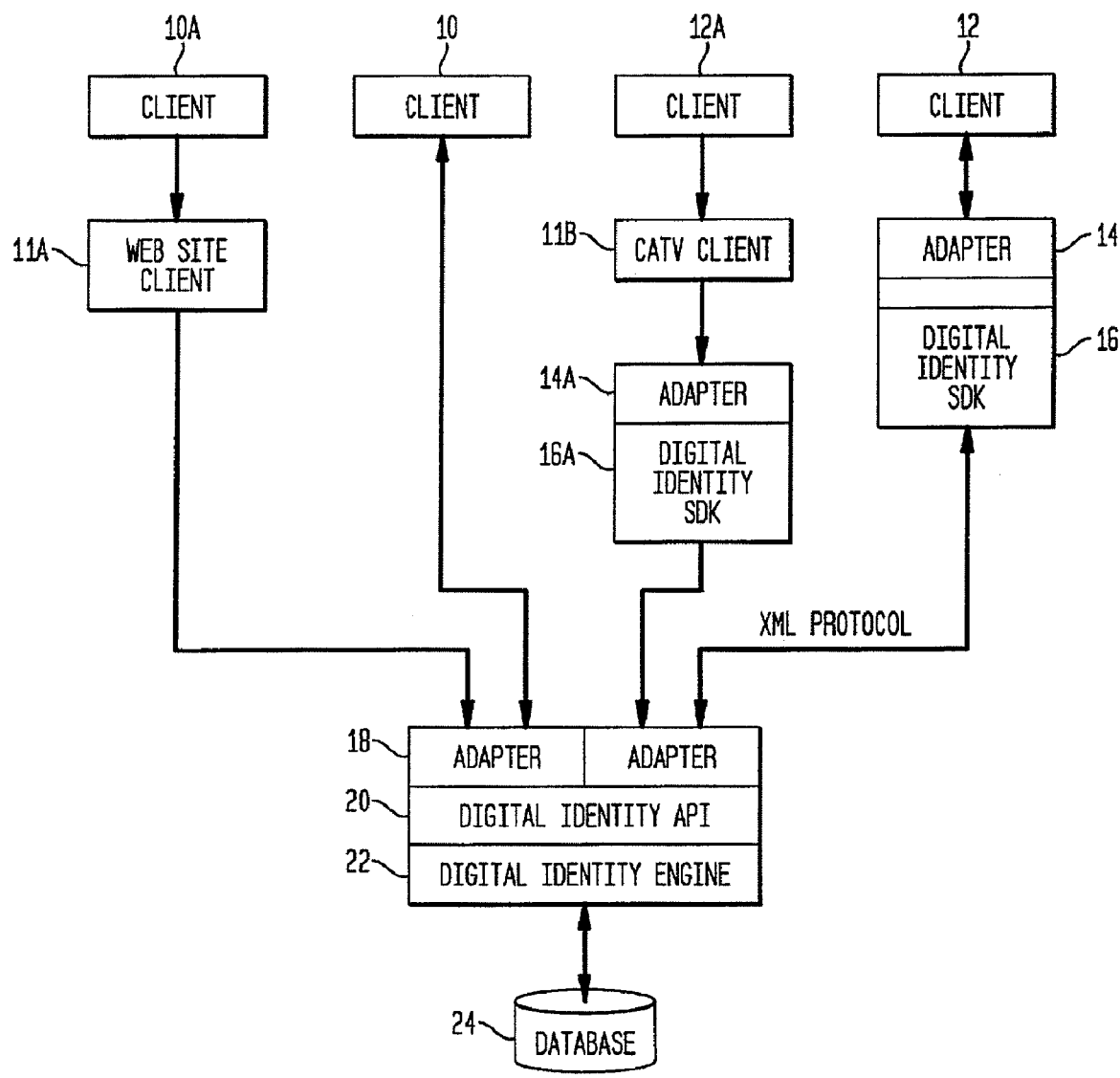
FIG. 1B is a block diagram of a system embodying a portable digital identity server in accordance with the present invention.

The overall digital identity system design is a four-tier architecture of clients 10, 10A, 12, 12A, adapters 18, 14, engine 22 with application programming interfaces 20 (APIs) and database 24 shown in FIG. 1B. The digital identity server 100 provides a mechanism to provide connectors to different devices 10, 12 (where client software resides) that can be hooked into the internal core digital identity engine 22. Such connectors are referred to herein as adapters 18, 14.

A digital identity software development kit (SDK) 16 permits other clients 12 to write specialized adapters 14. The specialized adapter 14 is a protocol translator written by an other client 12 using the digital identity SDK 16 that uses standardized XML protocol to communicate with a standard digital identity adapter to the digital identity engine 22.

Client software may reside in devices other than user devices 10, 12. In particular, a CATV system 11B can be a CATV client. In such case, digital identity software development kit (SDK) 16A permits a specialized adapter 14A to be written that uses standardized XML protocol to communicate with a standard digital identity adapter to the digital identity engine 22. As another example, a web site can be a web site client 11A communicating with the digital identity engine 22 via a standard adapters 18.

The digital identity engine 22 is the component that handles access to all of the data that adapters 10, 10A, 12, 12A (and thus clients) stored on the server side. The core engine 22 and its digital identity APIs 20 are written in Java to take advantage of Java Database Connectivity (JDBC) as the primary mechanism for accessing the digital identity data.

Application programming interfaces (APIs) are available as part of the TV Navigator platform (including client-side JavaScript and Java APIs) and as part of the Connect Suite platform (the server-side Java based, XML based and CORBA based APIs) that allow applications to be authored on top of the digital identity platform. CORBA, an acronym for Common Object Request Broker Architecture, is a type of object-oriented programming language system.

The digital identity server (100 in FIG. 1) further provides yet another interface that can be implemented by third parties in order to write specialized plug-ins (223 in FIG. 2A) to the digital identity server 100. Specialized plug-ins are used to access (in a transparent manner) information residing in external systems (234 in FIG. 2A) and including the legacy billing and SMS systems of the CATV operator (or other service provider).

Figure 2A:
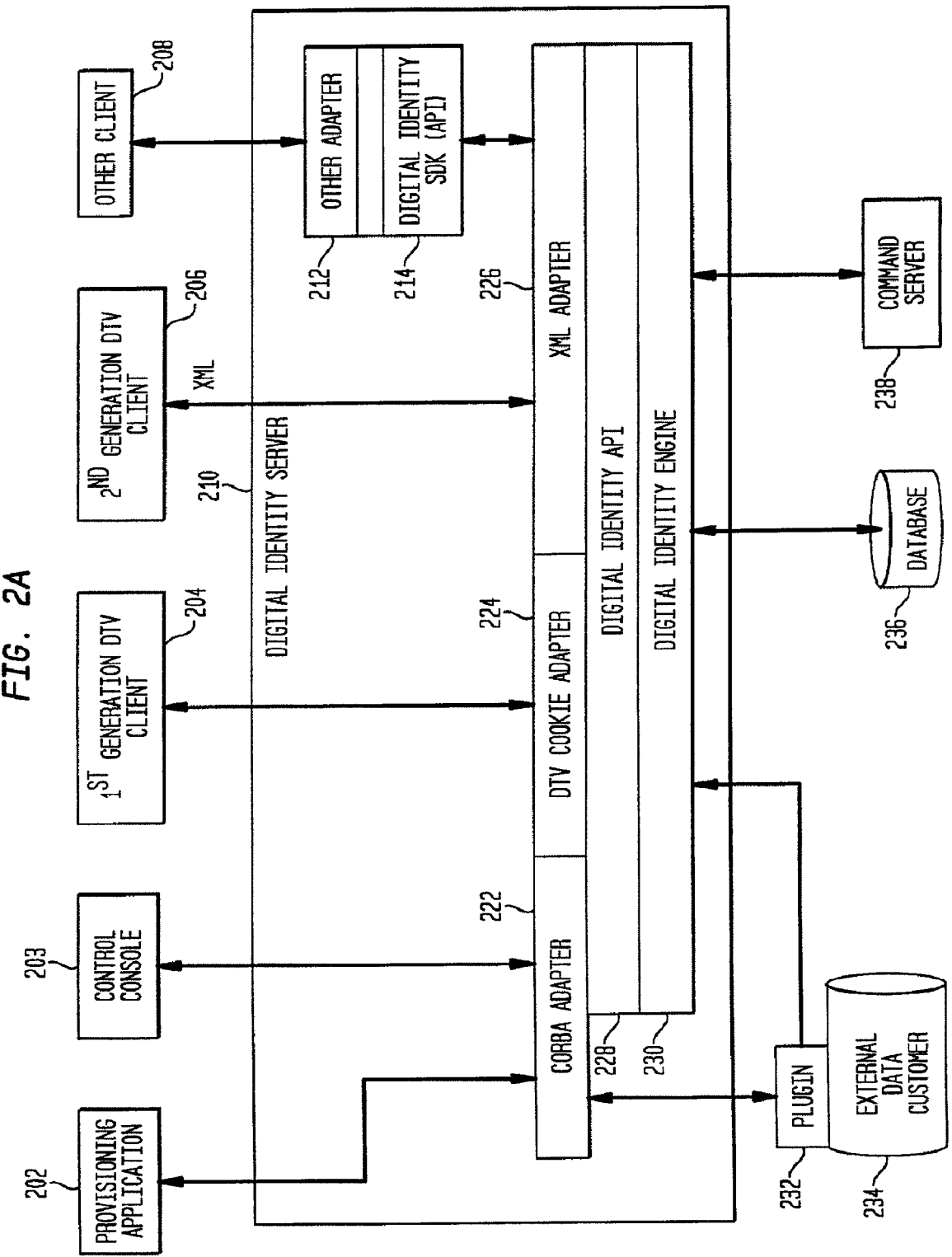
FIG. 2A is a block diagram further detailing the system architecture of a system embodying a portable digital identity server in accordance with the present invention.

The portable digital identity server 18, 20, 22 of FIG. 1B is shown in further detail in FIG. 2A (210). The digital identity Engine 230 provides an application programming interface (API) 228 to client adapter writers. The digital identity API is implemented as an efficient means for adapters to name, store, and control access to user data. The design relies on a relational database to provide the storage and indexing of user data.

The digital identity engine 230 is what implements the API that adapters 222, 224, 226 use to perform operations on data. Adapters are software components that communicate with clients. Various adapters are developed for the various clients that digital identity server 210 supports. For example, standard adapters include a CORBA adapter, a digital television and cookie adapter 224 and an XML adapter 226. Additional adapters 212 may be created using the software development kit 214.

Various client software 202, 203, 204, 206 and 208 communicates with the digital identity server 210 via a corresponding adapter. For example, a provisioning application 202 and a digital identity control console 203 interface through a CORBA adapter 222. A first generation digital television client 204 (using a proprietary protocol) interfaces through a digital television and cookie adapter 224. A next generation digital television client communicates with the digital identity server 210 through an XML adapter 226 (using a standard version of Extensible Markup language or XML) as would the additional adapter 212. CORBA Clients use their own protocol, notably CORBA IIOP in COBRA adapter 222, rather than XML/HTTP in adapter 226.

Similar to the operation of FIG. 1A, the command server 238 in FIG. 2A provides data on the nature and characteristics of the requesting user device. The digital identity server 210 then retrieves the digital identity information from either the system database 236 or an external database 234 and downloads it to the requesting user device.

Figure 2B:
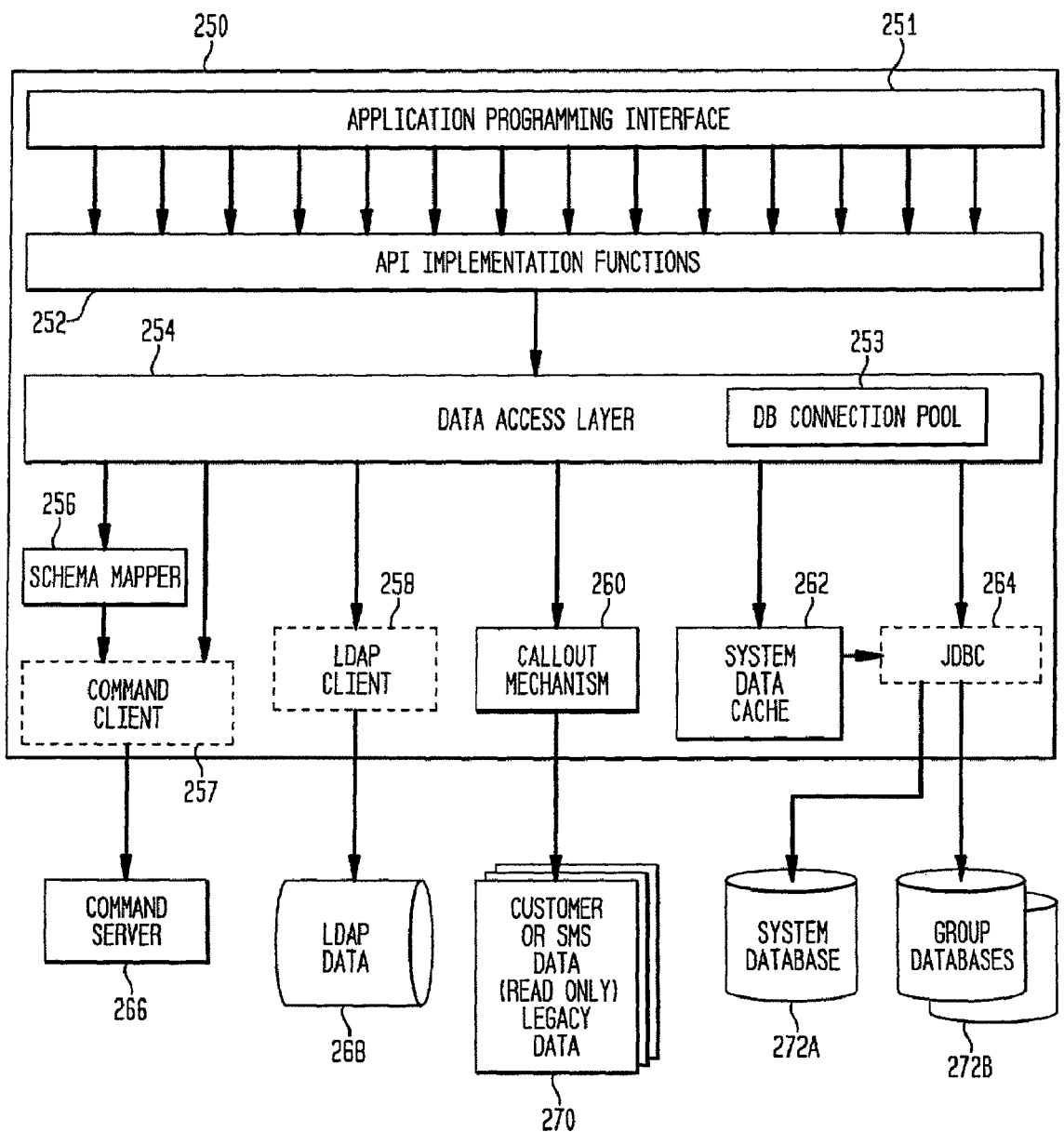
FIG. 2B is a block diagram further detailing the implementation of the data access function of a system embodied in a portable digital identity server in accordance with the present invention.

As shown in FIG. 2B, the digital identity engine 250 includes API implementation functions 252 responsive to the application programming interface 251. The digital identity engine 250 further comprises a data access layer 254 responsive to the API functions 252 to perform all of the mechanisms for abstracting or accessing data out of the backend (data storage).

The API implementation 252 communicates only with the data access layer 254 and not directly with the various backend data access functions such as Lightweight Directory Access protocol (LDAP) 258, 268, Java Database Connectivity (JDBC) 264, schema mapper 266, callout mechanism 260 and system data cache 262. (Liberate Technologies, 2 Circle Star Way, San Carlos, Calif. 94070). The design is quite general, in the sense that adding a new mechanism for accessing data would require no changes to the API implementation functions 252 or the adapters (18 in FIG. 1B).

A data access layer 254 in the digital identity engine 230 provides the following functionality: pools connections 253 to all data sources, including Group databases 272B, System database 272A, and Lightweight Directory Access protocol (LDAP) server(s) 268; dynamically updates and manage the relational database schema; use of the schema mapper 256 and system data cache 262 to implement its operations and abstract from the API implementation 252 how data is accessed and where it is stored, hiding the fact that the data is distributed; and provide the implicit mapping from the schema of the objects defined in XML to the database schema.

The Supported Objects are given in the table below. These objects are the same as the objects defined in the XML Protocol and used in the digital identity server.

| | |
|---|---|
| /account | (primary object) |
| /user | (primary object) |
| /machine | (primary object) |
| /account/users | (relationship --not extensible) |
| /account/machines | (relationship --not extensible) |
| /machine/users | (relationship --not extensible) |
| /user/cookies | (cookies --not extensible) |
| /user/services | (services) |
| /machine/services | (services) |
| /account/services | (services) |
| /user/favorites | (collection object) |
| /user/addressbook | (collection object) |
| ... (etc) | |

When a new type of collection object is introduced (such as Address Book), no new API functions are needed. Only a new object, and its associated XML schema are needed. The data access layer 254 maintains objects and their mappings to physical tables automatically, so that no code has to change at the data access layer 254 when a new object is created. The same is true for new attributes of existing objects.

API Implementation

The API implementation 252 calls only the various parts of the data access layer 254 to perform the functions it needs; it does not call any other pieces, nor does it access any database (268, 270, 272A, 272B) directly. The data access 254 layer maps each specific digital identity API 251 call into the (more general) data access call. For example, a CreateEntity API function calls the generic "create" or "set" method in the data access layer 254, after setting up all the right parameters, and the connection. Similarly, a GetCookies or GetProperties API function, calls a generic "get" method, after setting up all the parameters for each type of object (see object list above) to get the data from the database.

Schema Mapper 256

The Schema Mapper component 256 maintains the configuration of the XML schema objects, and their underlying physical tables. It also provides the data access layer 254 with a way to easily determine how to access a given piece of data. Furthermore, the schema mapper 256 stores XML schema blobs in the Command Server 266, allowing the customer to extend and control the schema dynamically (through GUI tools). Finally, the schema mapper 256 stores information about where attributes reside (Database, external Lightweight Directory Access protocol (LDAP), etc).

System Data Cache 262

The system data cache 262 minimizes the need to access the System database 272A, since it is a global bottleneck. It further stores servergroup information for users/machines/accounts in a data cache 262 so that trips to the System database 272A are eliminated whenever possible. The system data cache 262 further provides a way for the API implementation functions 252 to efficiently discover the user/machine/account relationships. Finally, the system data cache 262 ensures that the in-memory cache is kept consistent with the database, given that there may be multiple digital identity servers 250 behind a load balancer, and the servers need to appear stateless. The function of providing consistent state conditions across multiple digital identity servers is accomplished by allowing communication between multiple digital identity servers for notification purposes when an entity is deleted or moved.

Scalability

Each digital identity server 250 has the ability to connect to any datasource in the site, including all Group databases 272B, the System database 272A, and all external customer data (Lightweight Directory Access protocol (LDAP) 268, SMS 270, etc). However, each digital identity server 250 has the notion of a home server group, namely a group database 272B to which it is "tightly" bound, either through physical locality, or through logical locality (i.e. it expects to service a certain subset of users/machines/accounts in the normal case). The digital identity server 250 optimizes its access to its own home server group 272B as much as possible.

The digital identity server 250 provides less optimized access to other server groups' data for administration functions (such as MoveEntity) and to external customer data. The digital identity server 250 has the option to provide access to all functions on other server groups, if the adapters/Clients do not wish to connect to another digital identity server which is non-optimized. One digital identity server is able to service several adapters simultaneously. Load Balancing (when possible) is done between the clients and the adapters. In the alternative, load balancing may be done between the adapters and the digital identity Engine through the network adapter Call-Outs to Legacy Data The call-out component 260 retrieves data on a read-only basis from external (operator-managed) datastores 270. The customer data retrieval typically occurs as part of an operation like getProperties in the API. Use of the call-out 260 is dictated by the Schema Mapper 256, which notes where and how individual properties can be retrieved. The call-outs are used only for primitive properties of Entities, but may be generalized to apply to other data (like Services or Collections) as well. Data structures are discussed in conjunction with FIG. 3 through FIG. 7.

As a part of any call-out, the entityid must be converted into an ID that is meaningful for the external datastore. The conversion may involve a call into the system database 272A or user database, to retrieve other properties. The conversion activity is performed either in the data access layer, or within the specific modules that perform the call-out.

Similarly, propertyNames needs to be converted into external attribute names; this information is generally available through the command server 266.

When the call-out returns, the returned data is merged into the result set that is returned from digital identity (typically a sequence of PropertyNameValues), and is indistinguishable from other data.

External Data—Legacy Datastores

There are two call-outs shown in FIG. 2B: SMS (subscriber management system) 260 uses a general function call; Lightweight Directory Access protocol (LDAP) 258 is a special case for which higher-level support is provided. Both of these call outs are examples of the external data i.e. legacy datstores (234 in FIG. 2A).

SMS Call-Out

The SMS callout mechanism 260 uses a function call to a customer-provided routine. Typically, the SMS module is called with an entityid and one or more propertyNames. The SMS callout resolves the Id (convert to an external id), and then makes a function call to the external routine. In a Java implementation, this routine is typically provided as a .jar file, loaded as a plugin. The argument list for external function includes at least external entity ID and propertyName(s).

Lightweight Directory Access Protocol (LDAP) Call-Out

The Lightweight Directory Access protocol (LDAP) call-out provides high-level support for retrieving data from a Lightweight Directory Access protocol (LDAP) repository.

The data access layer calls the Lightweight Directory Access protocol (LDAP) module, supplying information such as the entityid and propertyName(s). The Lightweight Directory Access protocol (LDAP) call-out converts the entityid into an Lightweight Directory Access protocol (LDAP) Distinguished Name (possibly using information from the System DB or User DB), and converts the propertyNames into Lightweight Directory Access protocol (LDAP) attribute names (possibly using configuration parameters).

Using configuration parameters, it then forms and executes a complete Lightweight Directory Access protocol (LDAP) call to retrieve the data, such as an Lightweight Directory Access protocol (LDAP) URL, and processes the result set.

In a Java implementation, this Lightweight Directory Access protocol (LDAP) client can be implemented on Java Naming Directory Interface (JNDI). Most call-outs use the DirContext.getAttributes( ) method, to retrieve a set of Lightweight Directory Access protocol (LDAP) attribute values, which are merged into the digital identity result set.

Besides being easier to use than the more general call-out mechanism, the Lightweight Directory Access protocol (LDAP) module enables the data access layer 254 to pool 253 Lightweight Directory Access protocol (LDAP) connections, as it also does for Java Database Connectivity (JDBC) connections.

Digital Identity Software Development Kit

The diagram in FIG. 2C shows the sub-components of the Software Development Kit (SDK) and network adapter 288. The Software Development Kit (SDK) 276 and network adapters 288 both convert between the digital identity API and the network protocol (XML/HTTP).

The SDKs implement the digital identity API, hiding implementation details behind a standard interface. SDKs are delivered as libraries, which are used by customers who build out-of-process (external) adapters.

SDKs must be written in the same language as the corresponding adapters, so separate SDKs are required for each language in which adapters are written. SDKs are required for both Java and C/C++. Java adapters may be able to run natively (in-process), if their client-server protocol allows it. In-process adapters do not require SDKs.

The primary function of the SDK is to convert digital identity API calls into network-based communication with the digital identity server. A simplified process description is:

1. Call XML Publisher 284 to convert API command and data into XML.
2. Call HTTP module 280 to establish communication with server through connection pool 282; send XML request; receive response.
3. Call XML Parser 286 to parse response; convert to API data structures; return to caller.

Digital Identity Network Adapter 288

The network adapter 288 runs in the same process as the digital identity server, and services out-of-process adapters. The job of the network adapter 288 is the complement of the SDK 276; it converts XML/HTTP requests back into digital identity to API function calls. In this sense, the digital identity server is using its native network protocol as a sort of RPC mechanism for the external adapters to make calls to the digital identity engine. The extensible markup language (XML) is actually very well suited for this purpose.

Similar conversions to/from XML (shown as XML Publisher 284 and XML Parser 286) are performed in both the SDK and network adapter. These conversions share the same technology base, especially for XML parsing 286.

Adapters

Each adapter's 274 primary function is to translate the communication that it receives from its client in its native protocol to the Liberate digital identity API. Clients make requests to adapters to perform certain operations such as getting and setting of data. These requests are decoded and handled by the adapter, and translated into digital identity API calls; data returned from the API calls is encoded and sent to the client. As mentioned, adapters may run in-process or out-of-process; the API is identical in either case.

Compared to in-process adapters, external ones offer advantages (independence of programming language; stability of external process) and disadvantages (potential performance penalty of extra network hop). In general, in-process adapters should be used where possible, for performance reasons.

Adapters that rely on HTTP use the same mechanism for decoding and handling the network traffic as the digital identity network adapter (namely an HTTP server such as Apache) 298. A goal of the digital identity server is to use a single adapter to service all XML requests, be they from in-process or out-of-process adapters. To facilitate unification, a compatible XML format is adopted.

CORBA and LDAP Adapters

The digital identity server does not provide native interfaces for CORBA or Lightweight Directory Access protocol (LDAP). Clients that use these protocols require special-purpose adapters. The adapters implement the appropriate Server type (CORBA or LDAP), but use digital identity protocols on the back end.

CORBA

The CORBA adapter is needed to support the User Data Manager, which is a CORBA Client (which may be implemented as a Java applet). Like all CORBA servers, it supports an interface defined in an IDL. IDL has currently been defined for the digital identity engine consisting of about 40 operations, defined on 7 interfaces (object classes). This supports a particular object model, which may be been extended for digital identity. In order to make the new digital identity features accessible through CORBA, the IDL is extended. The adapter translates IDL calls into digital identity API calls.

The CORBA adapter may run either in-process or out-of-process with respect to the digital identity Engine. An in-process implementation links the digital identity Engine into the CORBA Server as a library, which is different from the method of running other in-process adapters, which are accessed through a web server interface. The out-of-process implementation uses the SDK and network adapter.

The Digital Identity Object Model

Figure 3:
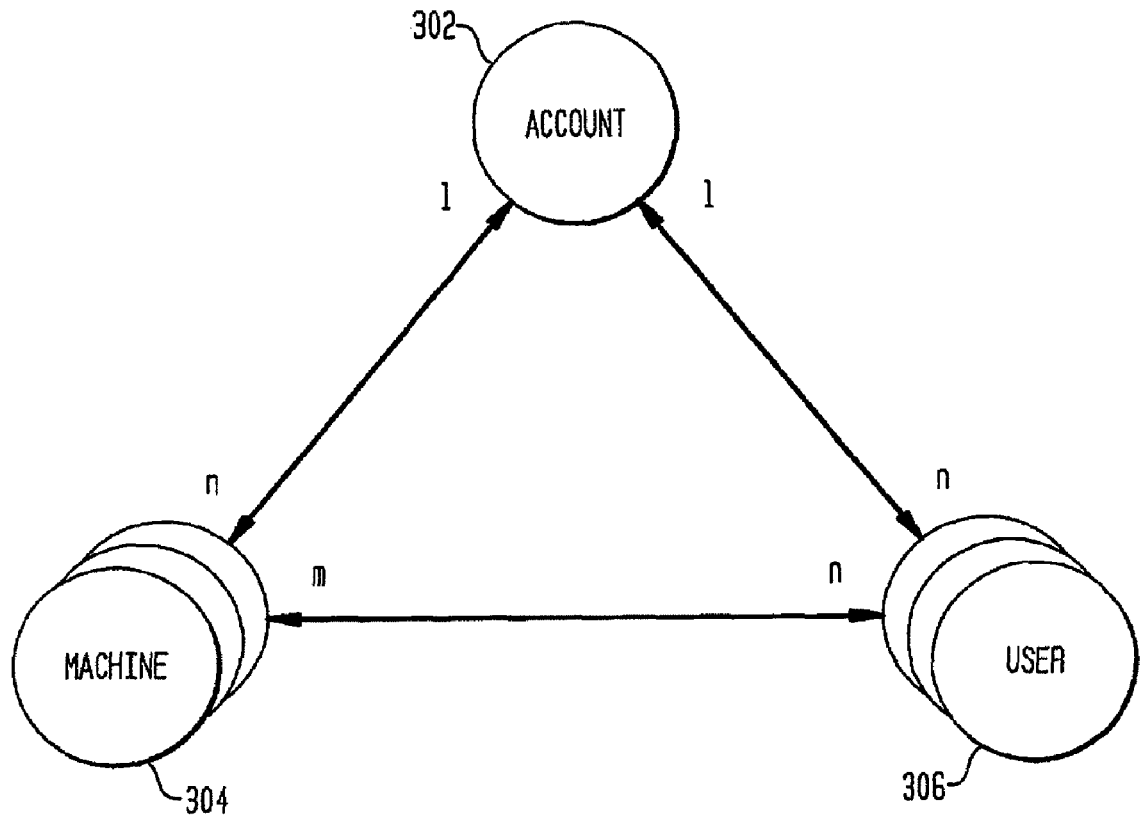
FIG. 3 is a block diagram of three top-level software objects: account, machine and user for use in conjunction with the present invention.

As shown in FIG. 3, there are three top-level object classes: Accounts 302, Users 306 and Machines 304. These three top-level object classes are collectively referred to as Entities. Individual Entities have a unique entityid, specified when the Entity is created. Each User 306 is associated with exactly one Account. Each Machine 304 is associated with exactly one Account. As illustrated by the 1 to N relationship an account 302 may have a plurality of users 306. As illustrated by the 1 to M relationship, an account 302 may have a plurality of machines 304. For example, a household CATV account 302 may include several family members as users 306, and have more than one CATV converter 304.

All Entities may have primitive Properties. Properties are typed; the current set of types is {string; integer; boolean; binary}. Besides the primitive Properties, Entities may have Collection Properties associated with them. Collections are structured objects—i.e., they have primitive Properties of their own. Collections may have many Instances for a given Entity; each Instance has a unique InstanceID, which can be used to access that Instance.

Figure 5:
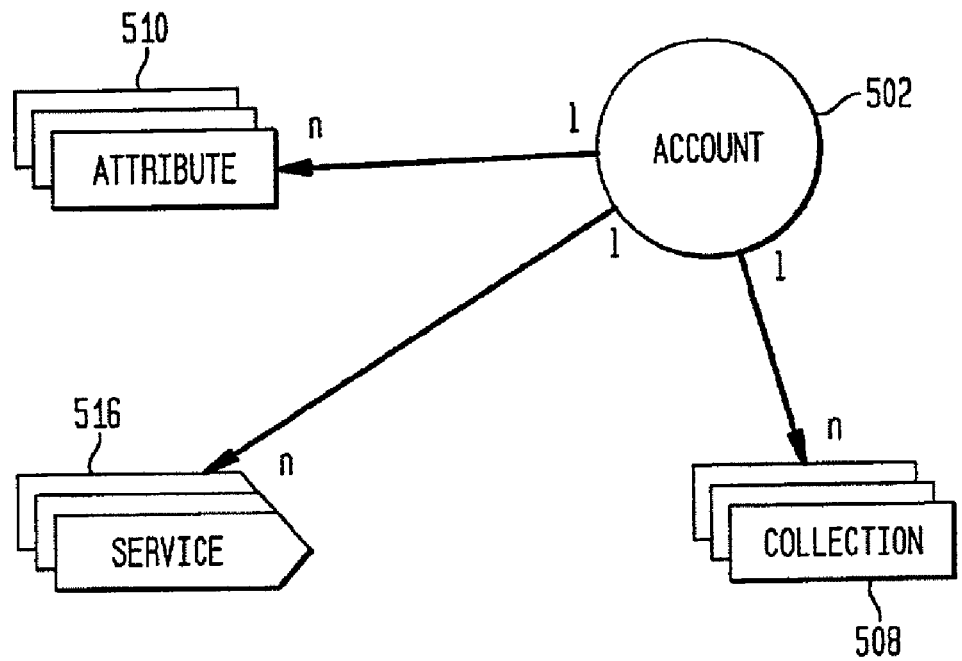
FIG. 5 is a block diagram of an account data object for storing an account's properties and billing information in accordance with the present invention.

As shown in FIG. 5, the account entity is associated with one or more attributes 510, services 516 and collections 508. An account entity 502 stores the properties of the account and billing information.

Figure 6:
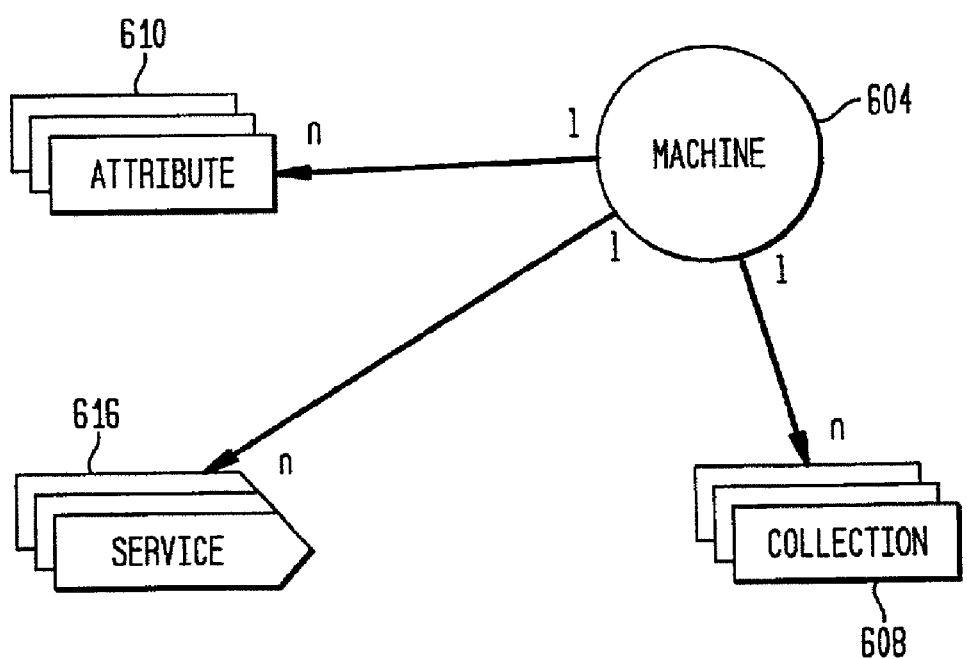
FIG. 6 is a block diagram of a machine data object for representing in interactive device for use in accordance with the present invention.
Figure 7:
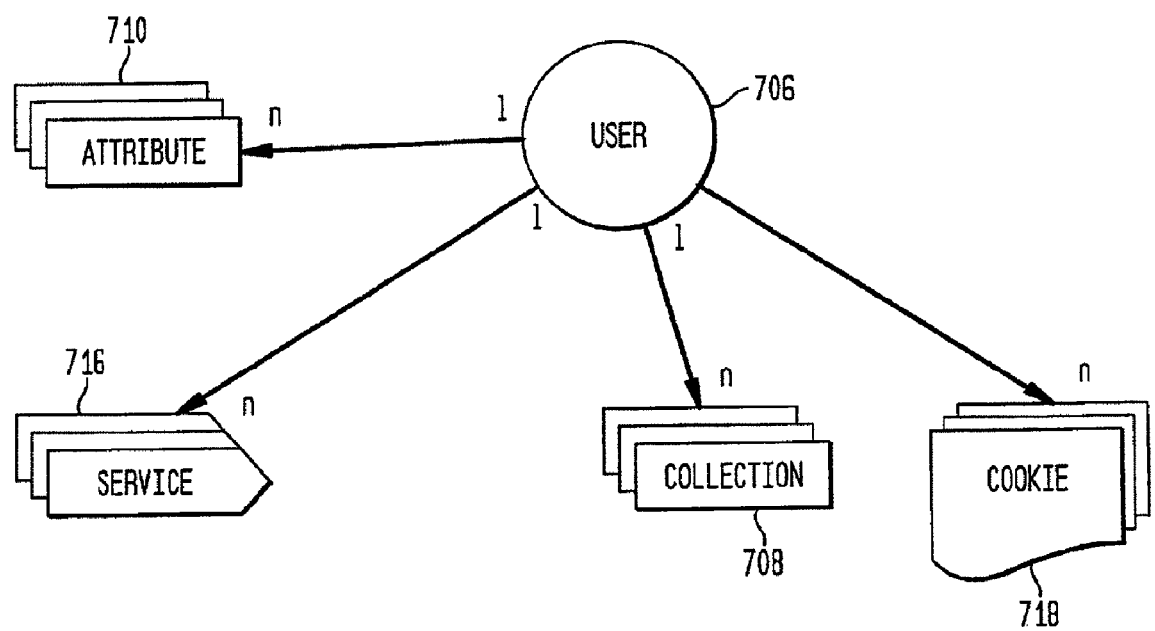
FIG. 7 is a block diagram illustrating a user data object representing a user of an interactive device or application in accordance with the present invention.

Similarly, FIG. 6 illustrates the machine entity 604 being associated with one or more attributes 610, services 616 and collections 608. The machine entity 604 represents an interactive device.

Figure 4:
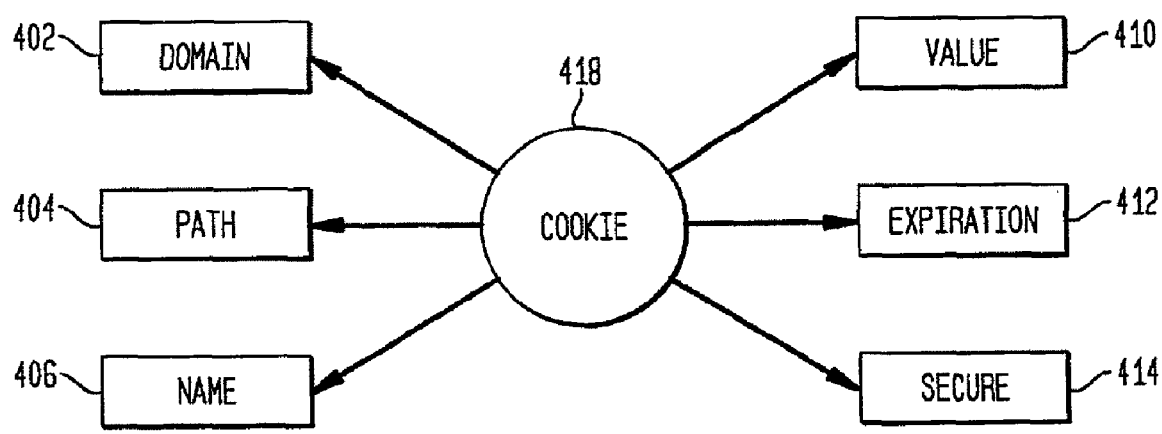
FIG. 4 is a block diagram of the attributes of an Internet browser cookie for use in conjunction with the present invention.

Similarly, the user entity 706 is associated with one or more attributes 710, services 716 and collections 708. A user entity 706 represents the user of an interactive device or application. In addition, the user entity 706 is associative with one or more cookies 718. As shown in FIG. 4, cookies have special Collection Properties, with particular semantics, such as name 406, path 404, domain 402, value 410, expiration 412 and security level 414.

Besides being associated with particular Entities, Collection Properties may have values at the global (System) level. Customers may define additional Properties for Accounts, Users, Machines, or Collection Properties, and may define additional Collection Properties. Entities have Server Groups, which specify where their data is located. Users and Machines associated with an Account have the same Server Group as the account.

Digital Identity Object Model

Figure 8:
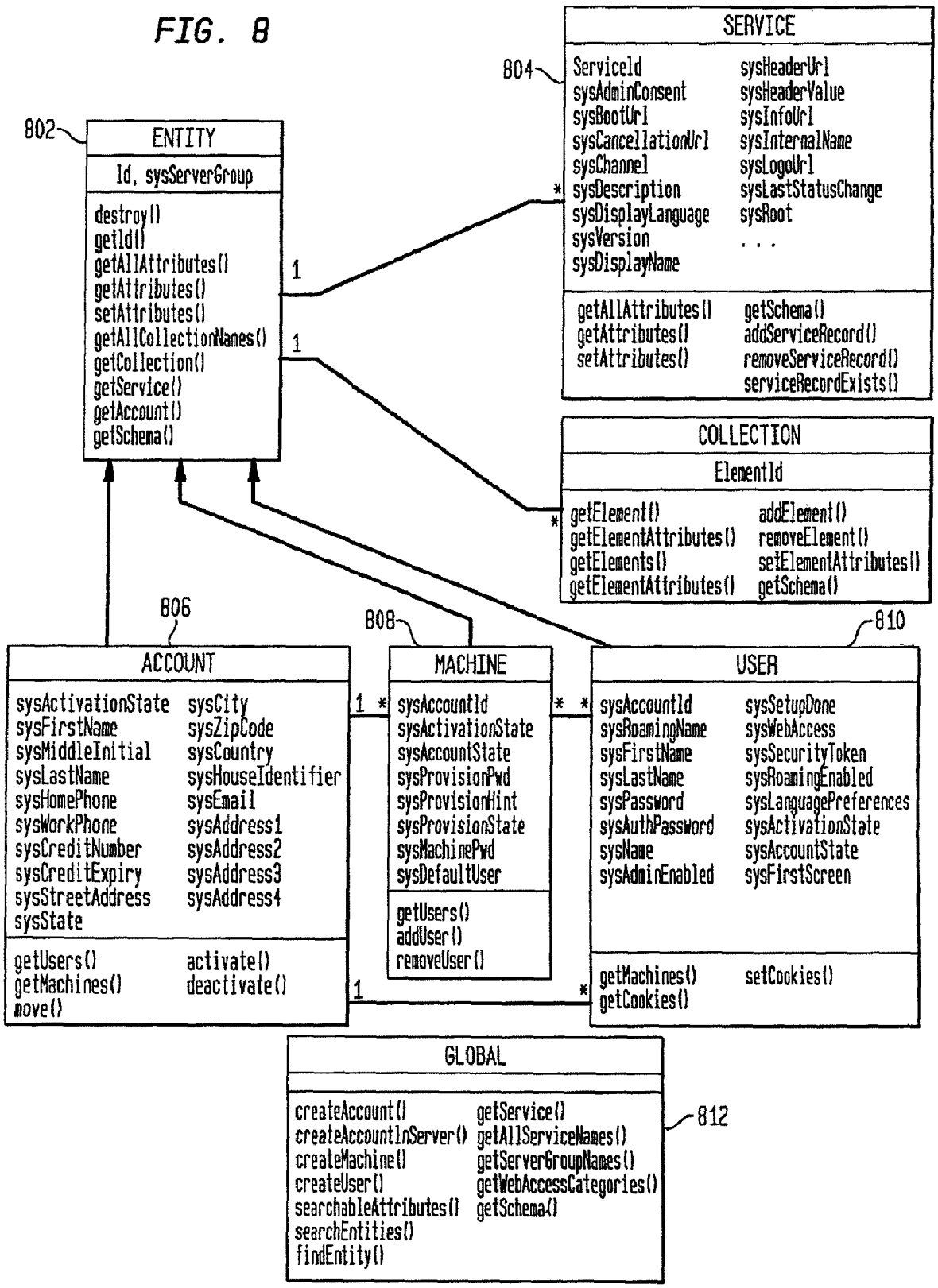
FIG. 8 is a hierarchical representation of the digital identity object model embodying the present invention.
Figure 9:
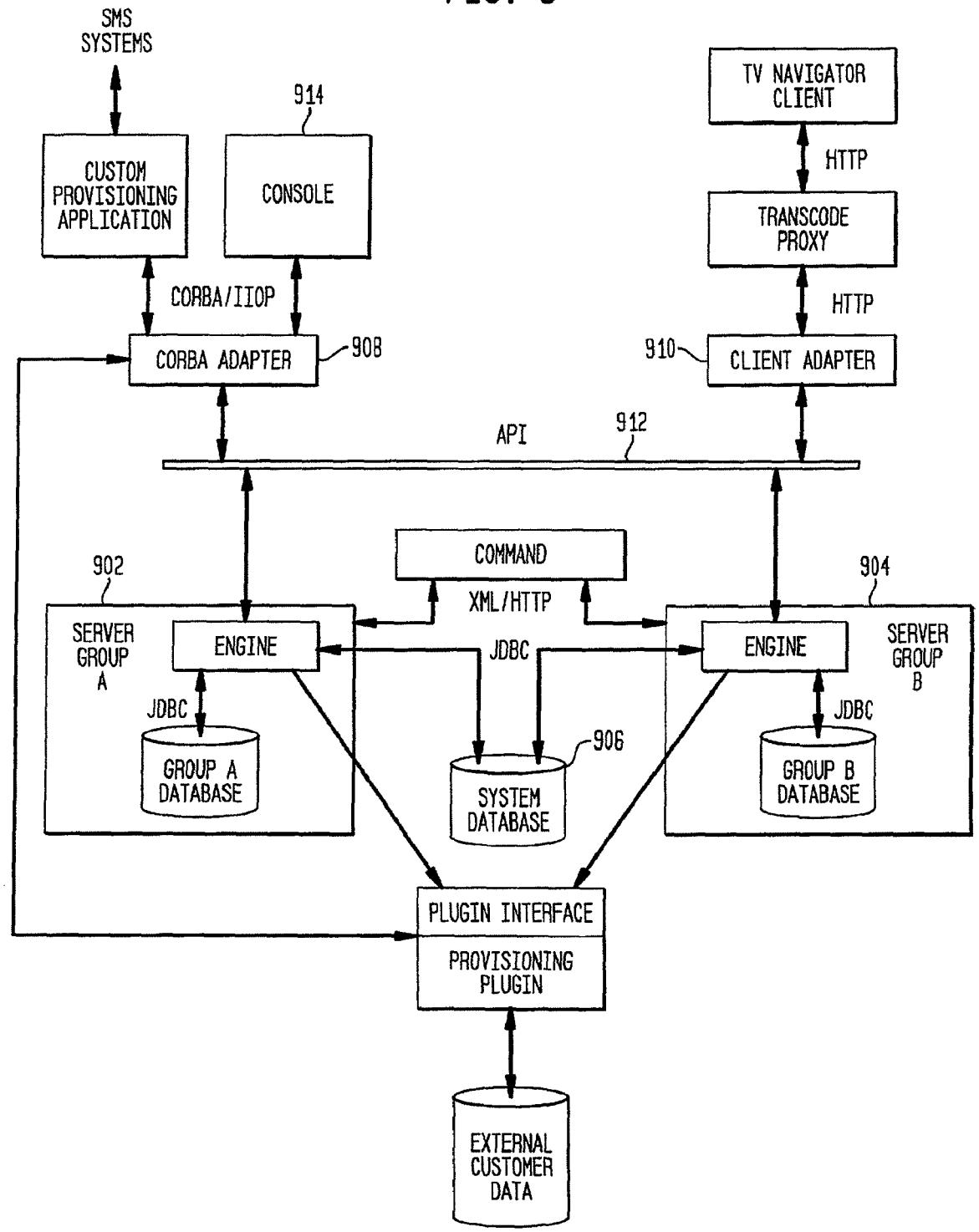
FIG. 9 is a system block diagram illustrating the scalability of the present invented system using server groups.

FIG. 8 is a hierarchical representation of the Digital identity object model. Various types of information are represented in the digital identity server to support the needs of administrators, applications, set-top boxes, and other users. The information is structured according to a particular model (schema), which reflects the world of Accounts, Machines, and Users. Information that is handled by the digital identity server can be accessed and manipulated in a variety of ways, including through CORBA, and from the settop box.

Entities and Relationships

The primary objects in the system are Entities 802, which correspond to Accounts 806, Machines 808, and Users 810. There are three subclasses of Entities to represent the three cases listed above: Accounts Entities represents a billing account. An Account may have multiple Machine and multiple User entities associated with it. Machine Entities represents a single set-top box. Each Machine object must always have an associated Account. User Entities represents a User on a set-top box. Each User object must always have an associated Account.

Standard UML notation is used to represent both the digital identity object model and the associated CORBA IDL. The boxes in FIG. 8 represent classes (CORBA interfaces) of which there are 7 in the system. Each box in FIG. 8 is divided into three regions; the top region shows the class name; the middle region shows the attributes that are defined in the base schema; the bottom region shows the operations (methods) that are defined in the CORBA IDL.

The lines among the boxes indicate relationships. The ones with arrowheads are generalizations; the others are associations, with the multiplicity indicated by the numbers at either end.

Digital Identity Server Groups

To improve scalability, network operators can create digital identity server groups. A deployment can have one or more digital identity server groups 902, 904, depending on how the network operator configures the system. Each server group 902, 904 has its own configuration settings and its own database. The use of server groups is convenient when managing a large number of subscribers.

Besides a database for each server group, there is a single, shared digital identity system database 906 that can be accessed by every digital identity server. The system database 906 contains basic information for all subscribers, while each server group database 902, 904 only contains information about the subscribers in that particular group.

Digital Identity Adapters

Digital identity adapters 908, 910 communicate with the digital identity servers 902, 904 across an API 912 that provides a single point of access to all data in all digital identity servers. This provides the following benefits: Different TV Navigator clients (such as TV Navigator Standard and Compact clients) can all access the same digital identity server or server groups. Developers can create custom provisioning applications that use the services of the digital identity CORBA adapter. These applications can also interface to external billing, customer service, and subscriber management systems, to interoperate with legacy systems. A simple graphical user interface is provided at the digital identity console 914, which can access and modify persistent data stored in the digital identity servers. The digital identity console 914 is implemented as a CORBA client. Through the provisioning plugin architecture, digital identity provides access to external back-end data stores, such as LDAP servers enabling system operators to access legacy data.

The digital identity architecture supports the development of new client adapters, as needed for emerging protocols.

Below are several examples of sample code for provisioning an account making requests and providing responses.

Sample Code for Provisioning an Account

```
Transaction.open( );
Account johnsAccount=Account.create("LondonServer-
    Group");
johnsAccount.setAttribute("sy sFirstName", "John");
johnsAccount.setAttribute("sysLastName", "Smith");
Machine setTopBox1=Machine.create(johnsAccount, "mac-
    Addr1");
Machine setTopBox2=Machine.create(johnsAccount, "mac-
    Addr2");
```

```
User john=User.create(johnsAccount);
john.setAttribute("sysName", "John");
john.setAttribute("sysPassword", "1234");
setTopBox1.addUser(john);
setTobBox2.addUser(john);
Transaction.commit( );
```

Example XML Request

```
<XMSG>
<AUTH CLASS = "USER" TYPE = "password" ID = "Ryan"
TOKEN = "a secret">
    <REQUEST OP = "GET">
        <OBJ N = "/user" ID = "Ryan"/>
    </REQUEST>
</AUTH>
</XMSG> Example XML Response
<XMSG>
<RESPONSE OP = "GET" STATUS = "OK">
    <OBJ N = "/user" ID = "Ryan"/>
        <AT N = "sysFirstName">Ryan</AT>
        <AT N = "sysLastName">King</AT>
    </OBJ></RESPONSE>
</XMSG>
```

The invention claimed is:

1. A method comprising:
receiving a first message at a digital identity server via a network, the first message comprising a video pause point of video presented at a first electronic communication device and identification information of a user;
retrieving, by the server, a digital identity of the user in accordance with the identification information;
storing the video pause point in the digital identity to generate an updated digital identity;
receiving a second message at the digital identity server from a second electronic communication device via the network, the second message comprising the identification information of the user and configuration information of second electronic communication device;
processing the identification information, by the server, to identify the updated digital identity;
processing the configuration information to confirm that the second electric communication device is capable of presenting the video prior to transmitting the video pause point; and
transmitting the video pause point via the network to permit presentation of the video at the second electronic communication device beginning at the video pause point.

2. The method of claim 1, further comprising:
processing the video to identify interest information for the user; and
causing delivery of targeted advertising to the second electronic communication device based on the interest information.

3. The method of claim 1, wherein the second message comprises user authentication information and wherein the method further comprises authenticating the user based on the user authentication information.

4. The method of claim 1, further comprising:
determining that a previous version of the digital identity has been forwarded to the second electronic communication device;
identifying a change between the previous version and the updated digital identity; and
transmitting the change to cause the second electronic communication device to update the previous version.

5. The method of claim 1, wherein the digital identity comprises a demographic profile, and wherein the method further comprises transmitting demographically targeted advertising to the second electronic communication device based on the demographic profile.

6. An apparatus comprising:
a processor; and
a memory storing software that, when executed, causes the apparatus to perform a method comprising:
receiving a first message via a network, the first message comprising a video pause point of video presented at a first electronic communication device and identification information of a user;
retrieving a digital identity of the user in accordance with the identification information;
storing the video pause point in the digital identity to generate an updated digital identity;
receiving a second message from a second electronic communication device via the network, the second message comprising the identification information of the user and configuration information of the second electronic communication device;
processing the identification information to identify the updated digital identity;
processing the configuration information to confirm that the second electronic communication device is capable of presenting the video prior to transmitting the video pause point; and
transmitting the video pause point via the network to permit presentation of the video at the second electronic communication device beginning at the video pause point.

7. The apparatus of claim 6, wherein the software, when executed, causes the apparatus to:
process the video to identify interest information for the user; and
cause delivery of targeted advertising to the second electronic communication device based on the interest information.

8. The apparatus of claim 6, wherein the second message comprises user authentication information and wherein the software, when executed, causes the apparatus to authenticate the user based on the user authentication information.

9. The apparatus of claim 6, wherein the software, when executed, causes the apparatus to:
determine that a previous version of the digital identity has been forwarded to the second electronic communication device;
identify a change between the previous version and the updated digital identity; and
transmit the change to cause the second electronic communication device to update the previous version.

10. The apparatus of claim 6, wherein the digital identity comprises a demographic profile, and wherein the software, when executed, causes the apparatus to transmit demographically targeted advertising to the second electronic communication device based on the demographic profile.

11. The apparatus of claim 6, wherein the first electronic communication device comprises a set top box and the second electronic communication device comprises a personal computer.

12. The apparatus of claim 6, wherein the first electronic communication device comprises a personal computer and the second electronic communication device comprises a set top box.

13. A computer readable storage device storing software that, when executed, causes an apparatus to perform a method comprising:

receiving a first message via a network, the first message comprising a video pause point of video presented at a first electronic communication device and identification information of a user;

retrieving, by the apparatus, a digital identity of the user in accordance with the identification information;

storing the video pause point in the digital identity to generate an updated digital identity;

receiving a second message from a second electronic communication device via the network, the second message comprising the identification information of the user and configuration information of the second electronic communication device;

processing the identification information, by the apparatus, to identify the updated digital identity;

processing the configuration information to confirm that the second electronic communication device is capable of presenting the video prior to transmitting the video pause point; and transmitting the video pause point via the network to permit presentation of the video at the second electronic communication device beginning at the video pause point.

14. The computer readable storage device of claim 13, wherein the software, when executed, causes the apparatus to:

process the video to identify interest information for the user; and cause delivery of targeted advertising to the second electronic communication device based on the interest information.

15. The computer readable storage device of claim 13, wherein the second message comprises user authentication information and wherein the software, when executed, causes the apparatus to authenticate the user based on the user authentication information.

16. The computer readable storage device of claim 13, wherein the software, when executed, causes the apparatus to:

determine that a previous version of the digital identity has been forwarded to the second electronic communication device;

identify a change between the previous version and the updated digital identity; and transmit the change to cause the second electronic communication device to update the previous version.

17. The computer readable storage device of claim 13, wherein the digital identity comprises a demographic profile, and wherein the software, when executed, causes the apparatus to transmit demographically targeted advertising to the second electronic communication device based on the demographic profile.

\* \* \* \* \*

UNITED STATES PATENT AND TRADEMARK OFFICE
CERTIFICATE OF CORRECTION

PATENT NO. : 7,870,219 B2  Page 1 of 1
APPLICATION NO. : 12/400541
DATED : January 11, 2011
INVENTOR(S) : Jonathan I. McCormack et al.

It is certified that error appears in the above-identified patent and that said Letters Patent is hereby corrected as shown below:

Column 1, Line 15:
    Delete the entire paragraph from lines 15-18.

Column 4, Line 1:
    Delete "though" and insert --through--.

Column 4, Line 34:
    Insert --to-- after the word "continue".

Column 8, Line 43:
    Insert --.-- after the word "adapter".

Column 13, Line 5:
    Delete "setTobBox2" and insert --setTopBox2--.

Signed and Sealed this
Twenty-second Day of November, 2011

David J. Kappos
*Director of the United States Patent and Trademark Office*